United States Patent [19]
Mahany

[11] Patent Number: 6,018,555
[45] Date of Patent: Jan. 25, 2000

[54] NETWORK UTILIZING MODIFIED PREAMBLES THAT SUPPORT ANTENNA DIVERSITY

[75] Inventor: Ronald L. Mahany, Cedar Rapids, Iowa

[73] Assignee: Intermec IP Corp., Woodland Hills, Calif.

[21] Appl. No.: 09/073,035

[22] Filed: May 5, 1998

Related U.S. Application Data

[63] Continuation of application No. 08/431,993, May 1, 1995, Pat. No. 5,748,676.

[51] Int. Cl.[7] .................................................. H04L 1/03
[52] U.S. Cl. .................. 375/347; 370/401; 453/277.2
[58] Field of Search .................................. 375/260, 347; 455/272, 277.1, 277.2; 370/401, 321, 315

[56] References Cited

U.S. PATENT DOCUMENTS

| | | | |
|---|---|---|---|
| 544,692 | 12/1895 | Siwiak et al. | 455/277.2 |
| 4,513,412 | 4/1985 | Cox | 370/315 |
| 4,777,542 | 10/1988 | Ozaki | 360/48 |
| 5,339,316 | 8/1994 | Diepstraten | 370/401 |
| 5,369,801 | 11/1994 | Smith | 455/277.1 |
| 5,781,540 | 7/1998 | Malcolm et al. | 370/321 |
| 5,781,592 | 7/1998 | Masuda | 375/347 |

*Primary Examiner*—Wellington Chin
*Assistant Examiner*—Congvan Tran
*Attorney, Agent, or Firm*—Akin, Gump, Strauss, Hauer & Feld, L.L.P.

[57] ABSTRACT

A network is disclosed which utilizes modified preambles in a communication network to facility antenna diversity and multipath compensation. In one embodiment, an antenna diversity protocol first directs a mobile transceiver to select any antenna that enables successful receipt and identification of at least a portion of the preamble, i.e., the selection of a satisfactory antenna. Once a satisfactory antenna is identified, the diversity protocol extracts from received portions of the preamble information necessary to determine whether there is enough preamble remaining to conduct a best antenna search. If so, the other antennas are sequentially selected to evaluate their performance. Thereafter, the diversity protocol directs the mobile transceiver to select the best antenna based on a performance comparison. If, however, the diversity protocol determines that there is not enough remaining preamble to conduct the best antenna search, the protocol directs the mobile transceiver to use the currently selected satisfactory antenna to receive the remainder of the communication packet. Providing an indication of remaining preamble, the preamble is either marked with at least one time stamp or contains at least two identifiably distinct preamble portions.

9 Claims, 10 Drawing Sheets

NETWORK UTILIZING MODIFIED PREAMBLES THAT SUPPORT ANTENNA DIVERSITY

CROSS-REFERENCE TO RELATED APPLICATIONS

The present application is a continuation of U.S. Application Ser. No. 08/431,993 filed May 1, 1995, now U.S. Pat. No. 5,748,676, by Ronald L. Mahany, which is hereby incorporated herein by reference in its entirety.

BACKGROUND OF THE INVENTION

In typical radio data communication systems, each radio transceiver is configured for use with a single antenna. However, single antenna configurations often prove inadequate for maintaining wireless communication because of inherent antenna orientation and performance limitations. To solve such inadequacies, some radio transceivers have been configured with a second antenna having alternate orientation and/or performance characteristics. With two antennas, the transceiver can select one of the two antennas based on the receipt of incoming communications.

More specifically, in current dual antenna designs, the selection process (referred to hereinafter as an "antenna diversity protocol") involves the selection of either a best antenna or a satisfactory antenna. To select the best antenna, the transceiver listens to transmissions using the first antenna and then the second antenna. Thereafter, for further communication, the transceiver selects the antenna that yielded the best reception performance. In a satisfactory antenna diversity protocol, the transceiver first listens with the first antenna. If reception proves satisfactory, the transceiver selects the first antenna for further communication. Otherwise, the transceiver listens using the second antenna, and, with satisfactory reception, the second antenna is selected.

With single antenna configurations, a transceiver adds a specific preamble bit sequence to each packet of data to be transmitted. Knowing the specified preamble in advance, another transceiver that successfully receives such a transmission can easily detect and lock on to the preamble portion of the transmission. Having identified the preamble portion, a receiving transceiver can be fairly confident that it can successfully receive the subsequent information portion of the transmission. If instead the preamble cannot be discerned, a receiving trsceiver concludes that it cannot reliably receive the subsequent data portion of the transmission.

To accommodate preamble identification, the preamble must be of such content and duration as to permit reliable identification by a receiving transceiver. For example, some current preambles consist of a "101010 . . . " bit pattern sequence, because such a sequence can be rapidly detected. Depending the specific sequence (the content), a transceiver will require a certain duration of time (i.e., a certain number of received preamble bits) to identify a preamble. Thus, if the preamble portion of the packet is made too short in duration, transceivers would not be able to make an accurate identification before the data portion of the transmission begins. If the preamble portion is too long, the overhead associated with sending the preamble becomes highly undesirable due to the inherent decrease in data transmission throughput. Additionally, longer overall packet size (caused by longer preamble lengths) leads to a higher likelihood of reception failure. In many system protocols a longer preamble increases the chances for collisions between two or more units competing with the channel. Thus, the preamble portion of the packet must be of only such duration as to permit reliable preamble identification by the transceivers.

To accommodate best or satisfactory diversity protocols, transceivers have been configured to perform their antenna selection during the preamble portion of a transmitted packet. Unlike single antenna configurations, however, transceivers having multiple antennas must be capable of identifying the preamble of a transmission a plurality of times.

For example, using the best antenna diversity protocol, a transceiver having access to two antennas must first attempt to identify the preamble with the currently selected antenna. After either identifying or failing to identify the preamble, the transceiver switches to the other antenna to also attempt to identify the preamble. If the transceiver fails to identify the preamble with either antenna, the transceiver does not attempt to receive the data portion of the transmission because of reliability concerns.

If only one of the two antennas yielded a satisfactory identification of the preamble, the transceiver utilizes that antenna (the "successful antenna") to attempt to receive the subsequent data portion of the transmission. If the successful antenna happened to be the one currently selected, the transceiver merely listens for the end of the preamble and beginning of data. However, if the successful antenna happened to be the previously selected antenna, the transceiver must switch antennas and re-identify the preamble before the data begins. Otherwise, the transceiver cannot count on reliable receipt of the data portion of the transmission.

If both of the antennas yield a satisfactory identification of the preamble, the transceiver selects that antenna which exhibits the best signal quality (the "best antenna"). This may also require that the transceiver switch antennas and re-identify the preamble if the best antenna is not currently selected.

Thus, using the best antenna diversity protocol with two antennas, to accommodate worst case scenarios, the preamble must be about three times longer in duration than that necessary for a single antenna, i.e., three time periods for preamble identification attempts (hereinafter "observation windows") plus two antenna switching time periods.

Similarly, to support the worst case scenario, the satisfactory antenna diversity protocol using two antennas requires a preamble of about two times the duration of that needed for single antenna configuration. Specifically, where the first antenna cannot satisfactorily identify the preamble, the preamble length must include: 1) a first time period for attempting to identify the preamble with the first antenna (a "first observation window"); 2) a second time period during which the transceiver switches to the second antenna; and 3) a third time period for attempting to identify the preamble with the second antenna (a "second observation window").

Causing further problems for the diversity protocols, transceivers occasionally miss the beginning of a preamble period, and, therefore, unexpectedly encounter the end of the preamble and beginning of the data. Often this unexpected encounter results in the diversity protocol's failure to complete the antenna selection process within the remaining preamble time period, resulting in a lost transmission. Factors causing a transceiver to miss the beginning portion of a preamble include: 1) collisions with another transmission; 2) other types of interference or noise; or 3) an inopportune beginning of reception after the start of the preamble transmission.

Because transceivers do not detect that they have missed part of the preamble, they may invoke a diversity protocol that is destined to fail. Best antenna diversity protocols are extremely vulnerable in such situations, frequently missing transmissions that a single antenna systems would receive.

Although the satisfactory antenna diversity protocol provides the most immunity to an unexpected preamble end, the satisfactory protocol does not always use the "best" antenna available for a given communication. As a result, transmission failures after successful antenna selection are more likely to occur with the satisfactory protocol than with a best antenna diversity protocol.

In addition, many current transceivers implement various forms of multipath compensation (also referred to herein as "adaptive equalization") using the preamble. As with diversity protocols, each multipath compensation technique requires a certain duration of preamble for successful application, with some (typically better) techniques taking much longer than others. If the beginning of a preamble is missed, such techniques fail upon encountering an unexpected end of the preamble.

Factors for selecting a preamble bit sequence to provide optimal adaptive equalization often conflict with factors for providing rapid preamble identification. Thus, in current preamble bit sequences, compromises are made. As a result, either the ease of preamble identification or adaptive equalization or both suffer.

More specifically, IEEE 802.11 compatible communication networks provide a preamble of a duration proposed to be sufficient to support antenna diversity and multipath compensation. The specified preamble bit sequence (or preamble content) consists of a known uniform sequence. For example, a "dotting pattern" of 1-0-0 . . . is specified for Frequency Hopping (FH) communication, and a "marking pattern" of 1-1-1-1 . . . is specified for Direct Sequence (DS) communication. Both of these simple bit sequence patterns have been selected because they are easily recognized by transceivers as the preamble. More complex sequences having longer-repeating or non-repeatable bit patterns are much harder to recognize. However, neither of these bit sequence patterns provide an indication of the beginning of a preamble or warn of a preamble end.

With the currently specified uniform preamble sequence, a receiver, attempting to identify the preamble for the first time, has no knowledge of whether it has synchronized to the first bits of the preamble, the center, or the end. Therefore, the worst possible timing relationship between start of transmission and antenna sampling must be assumed in designing a diversity protocol. For example, to support two antennas, the best antenna protocol requires only two or three observation periods to make a decision. Even so, to accommodate at least a percentage of worst case scenarios (wherein the beginning of the preamble has been missed), five of such observation periods might be included in the preamble length. Yet where antenna scanning and start of transmission happen to coincide, the last two or three periods would constitute unnecessary overhead. The timely receiver is forced to wait through such periods not knowing when to expect the preamble end.

Moreover, the subject of antenna selection has been discussed in detail in a recent paper entitled "Carrier Sense with Diversity Modifier FH PHY" by Dean Kawaguchi, IEEE P802.11-94/70, March 1994. Kawaguchi discloses methods for performing two-antenna selection diversity, but does not consider alternatives such as n antenna selection diversity, adaptive equalization, maximum ratio combining, or RAKE approaches for direct sequence. All of these techniques generally benefit from training during the preamble period, and all are subject to the aforementioned limitations faced by antenna diversity and multipath compensation protocols.

Therefore, an object of the present invention is to provide transceivers in a wireless communication network with the capability of optimally using a preamble of minimal duration for all preamble purposes.

It is a further object of the present invention to provide an optimal "n" antenna diversity protocol which does not suffer from unnecessary preamble overhead, and which implements the advantages of both the satisfactory and best antenna diversity protocols.

It is another object of the present invention to prevent a transceiver from encountering an unexpected end of a preamble, regardless of whether the beginning of a preamble transmission has been missed.

Another object of the present invention is to inform transceivers of their location in the preamble so that they can most appropriately select from their available antennas without unexpectedly encountering a preamble end.

Still other objects of the present invention will become apparent with further reference to the remaining specification, claims and related figures.

SUMMARY OF THE INVENTION

These and other objects of the invention are achieved in a method for use in a communication network having a transmitter and a receiver. The receiver has a plurality of antennas, and the transmitter and receiver use a preamble of a communication packet to facilitate an antenna diversity protocol in the receiver. The method comprises the steps of first transmitting by the transmitter a first bit sequence of the preamble. Next, the transmitter transmits a time stamp bit sequence of the preamble where the time stamp bit sequence is identifiably distinct from the first bit sequence of the preamble and where the time stamp bit sequence of the preamble is identifiable by a receiver for use in an antenna diversity protocol. The transmitter then transmits a second bit sequence of the preamble and the remainder of the communication packet.

In another embodiment, after the transmitter transmits the time stamp bit sequence of the preamble, the receiver attempts to select a best antenna from the plurality of antennas for receipt of the remainder of the communication packet if the time stamp bit sequence is successfully received by the receiver.

In a further embodiment, the method comprises the steps of first beginning to transmit, by the transmitter, a first bit sequence of a preamble, the first bit sequence being identifiable by a receiver for use in an antenna diversity protocol. After transmission of the first bit sequence has ended, the transmitter begins to transmit, a second bit sequence of the preamble, the second bit sequence of the preamble identifiably distinct from the first bit sequence of the preamble, the second bit sequence being identifiable by a receiver for use in the antenna diversity protocol. After transmission of the second bit sequence has ended, the transmitter transmits the remainder of the communication packet.

In another embodiment, after the step of beginning to transmit by the transmitter a first bit sequence of a preamble, the receiver attempts to select a best antenna from the plurality of antennas for receipt of the remainder of the communication packet if the first bit sequence is successfully identified by the receiver.

In a still further embodiment, after the step of beginning to transmit by the transmitter a second bit sequence of the preamble, the receiver accepts a satisfactory antenna from the plurality of antennas for receipt of the remainder of the communication packet if the first bit sequence is not successfully identified by the receiver.

In yet another embodiment, the method comprises the steps of selecting and beginning to transmit, by the transmitter, a first of a plurality of preamble portions, each preamble portion being distinguishable from the other of the plurality of preamble portions by a receiver for use in an antenna diversity protocol. After transmission of the selected preamble portion, the transmitter selects and begins to transmit another one of the plurality of preamble portions. The transmitter repeats this step if other of the plurality of preamble portions have not yet been transmitted. Then, the transmitter transmits the remainder of the communication packet.

In another embodiment, after the step of selecting and transmitting by the transmitter one of a plurality of preamble portions, the receiver attempts to select a best antenna from the plurality of antennas for receipt of the remainder of the communication packet if the first preamble portion transmitted is successfully identified by the receiver.

In a still further embodiment, the receiver uses an observation window to carry out the antenna diversity protocol, and, after the step of selecting and transmitting by the transmitter one of a plurality of preamble portions, the receiver lengthens the observation window for use in the antenna diversity protocol if the first preamble portion transmitted is successfully identified by the receiver.

In yet another embodiment, after the step of selecting and beginning to transmit by the transmitter another one of the preamble portions, the receiver begins to perform adaptive equalization if the antenna diversity protocol has completed antenna selection.

In another embodiment, after the step of selecting and beginning to transmit by the transmitter another one of the preamble portions, the receiver accepts a satisfactory antenna from the plurality of antennas for receipt of the remainder of the communication packet if both the selected one of the preamble portions is the last of the plurality of preamble portions to be transmitted, and no previously transmitted preamble portions were successfully identified by the receiver.

The full details of the subject invention will become apparent from the following detailed description taken in conjunction with the drawings and claims.

DETAILED DESCRIPTION OF THE INVENTION

Figure 1:
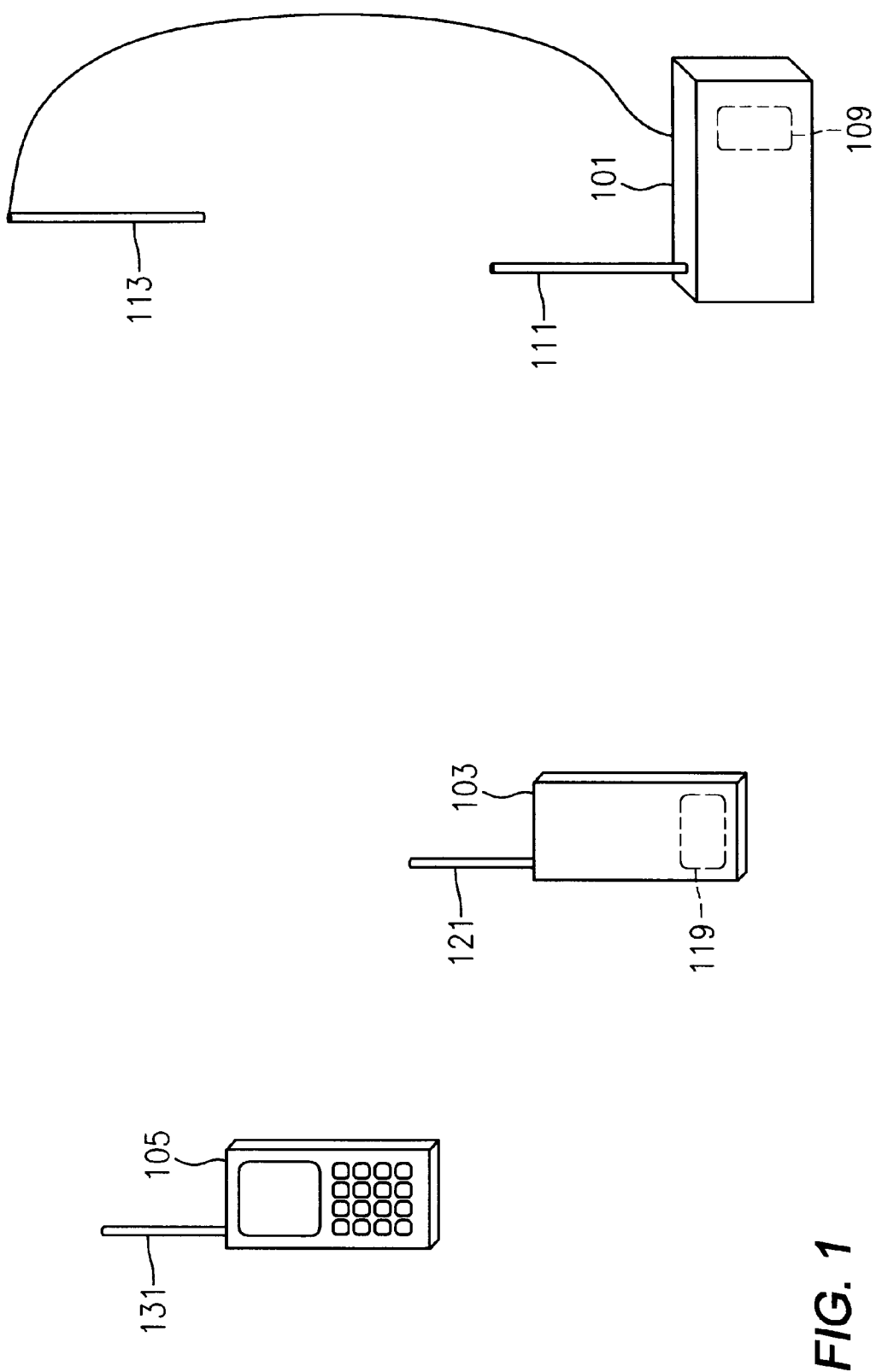
FIG. 1 is a perspective diagram illustrating a radio communication network wherein radio transceivers utilize multiple antennas and a diversity protocol in accordance with one embodiment of the present invention.

FIG. 1 is a perspective diagram illustrating a radio communication network wherein radio transceivers utilize multiple antennas and a diversity protocol in accordance with one embodiment of the present invention. In particular, a stationary transceiver 101 communicates via radio frequency (RF) transmissions with mobile transceivers 103 and 105. The mobile transceivers 103 and 105 may communicate with each other either directly, or indirectly through the stationary transceiver 101. The mobile transceivers 103 and 105 might be hand-held, vehicle mounted units, etc.

As illustrated, the stationary transceiver 101 utilizes either an internal loop antenna 109, an attached monopole antenna 111, or a remote monopole antenna 113. Similarly, the mobile transceiver 103 utilizes an internal loop antenna 119 or an attached monopole antenna 121. The mobile transceiver 105 only has an attached monopole antenna 131. Additional or alternate antenna configurations for any of the transceivers might also be implemented.

To communicate, the stationary transceiver 101 selects one of the antennas 109, 111 or 113, and begins transmitting a communication packet to, for example, the mobile transceiver 103. The stationary transceiver 101 selects the antenna based on whichever antenna was previously used to conducting a successful communication exchange with the intended destination, i.e., in this example the mobile station 103. The communication packet contains a preamble followed by data, instructions and/or other information destined for the mobile transceiver 103.

In response and in accordance with an antenna diversity protocol, the mobile transceiver 103 attempts to select an antenna to receive the communication packet. The antenna diversity protocol of the mobile transceiver 103 exhibits a preference toward the selection of the antenna capable of receiving the communication packet with the greatest signal quality (i.e., toward selecting the "best antenna"). However, if the diversity protocol concludes that selection of a best antenna is not likely to be possible, the first antenna that seems capable of receiving the communication packet is selected to receive the communication packet.

More specifically, to facilitate the antenna diversity, the preamble of each communication packet is used by the receiver portion of the mobile transceiver 103 to carry out the antenna diversity protocol. The stationary transceiver 101 subdivides the preamble into a plurality of preamble portions for successive transmission to the mobile transceiver 103. By extracting information from whatever part of the successively transmitted plurality of preamble portions that is actually received, the mobile transceiver 103 can determine whether to attempt to identify a best antenna or to merely accept a satisfactory antenna.

For example, in one embodiment, the antenna diversity protocol first directs the mobile transceiver 103 to select any antenna that enables successful receipt and identification of at least a portion of the preamble, i.e., the selection of a satisfactory antenna. Once a satisfactory antenna is identified, the diversity protocol extracts from received portions of the preamble information necessary to determine whether there is enough preamble remaining to conduct a best antenna search. If so, the other antennas are sequentially selected to evaluate their performance. Thereafter, the diversity protocol directs the mobile transceiver 103 to select the best antenna based on a performance comparison. If, however, the diversity protocol determines that there is not enough remaining preamble to conduct the best antenna search, the protocol directs the mobile transceiver 103 to use the currently selected satisfactory antenna to receive the remainder of the communication packet.

Although FIG. 1 illustrates a specific embodiment using mobile and stationary transceivers, any other combination of mobile transceivers or stationary transceivers or both might alternately be used with the present invention. In addition, the stationary transceiver 101 might also constitute a relay point, data base server and/or access point to another wireless or wired network. Similarly, the mobile transceivers 103 and 105 might be electrically connected via PCMCIA slots to combined with computer terminals or tablets, for example. Moreover, as mentioned hereinafter, the term "receiver" refers to both a separate receiver only device as well as a transceiver utilizing the receiver portion of the transceiver circuitry (see for example, FIG. 10). Similarly, the term "transmitter" refers to either a transmit only device as well as transmitter circuitry of a transceiver.

Figure 2:
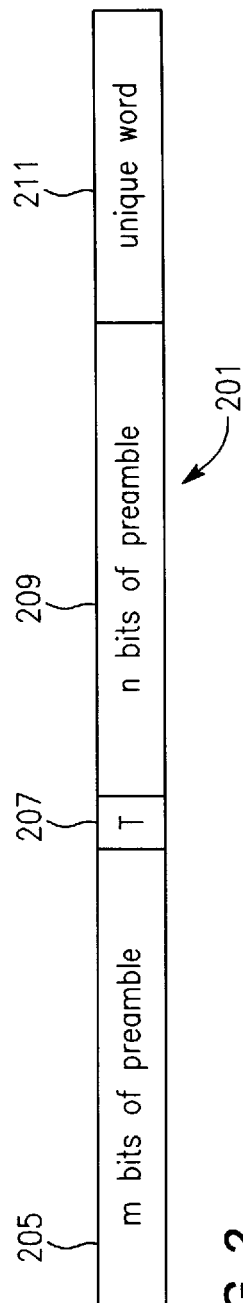
FIG. 2 is a diagram which illustrates a generic embodiment of a preamble bit sequence having a single time stamp for use with the antenna diversity protocol of the radio communication network of FIG. 1.

FIG. 2 is a diagram which illustrates a first generic embodiment of a preamble bit sequence having a single time stamp for use with the antenna diversity protocol of the radio communication network of FIG. 1. In this generic embodiment, a preamble 201 consists of, in sequence, m bits of preamble 205, a time stamp bit sequence 207, n bits of preamble 209, and a unique word 211. All communication packets transmitted by transceivers in the network contain this preamble 201 followed by the actual information to be communicated, i.e., the data, instructions or other content intended to be communicated. Thus, as previously mentioned, the preamble 201 constitutes overhead.

The length of the m bits of preamble 205 is preselected to provide sufficient time for a receiver to successfully identify a satisfactory antenna at least some margin before encountering the time stamp 207. Thereafter, using the satisfactory antenna, the receiver listens for the time stamp 207. If the time stamp 207 is detected, the receiver concludes that it has sufficient time remaining, i.e., the duration associated with the n bits of preamble 209, to conduct a best antenna search.

In addition, non-configured receivers (i.e., receivers which are not configured to identify either the time stamp 207 or the m bits of preamble 205, but which are configured to identify the n bits of preamble 209 and the unique word 211) cannot identify the content of fields 205 and 207, and, therefore, will effectively ignore them. Instead, the non-configured receivers only detect the latter portion of the extended preamble 201, and does not know whether the preamble has been extended or not. Thus, with either the extended or the non-extended preamble, the non-configured receivers merely identifies a satisfactory antenna in the field 209, identifies the unique word in the field 211, and receives the subsequent communication packet content.

Figure 3:
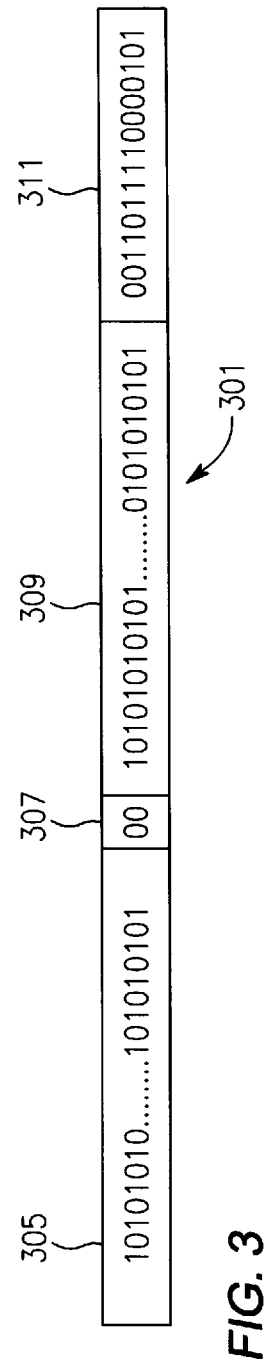
FIG. 3 is a diagram which illustrates a specific embodiment of the preamble bit sequence of FIG. 2 which utilizes the single time stamp.

FIG. 3 is a diagram which illustrates a more specific embodiment of the preamble bit sequence of FIG. 2 which utilizes the single time stamp. Initially, using the satisfactory antenna selection process defined by an antenna diversity protocol controlling a receiver, the receiver selects a first antenna and uses it to attempt to identify the preamble bit sequence "1010 . . . ", as is contained in either an m bits of preamble field 305 or an n bits of preamble field 309. If the bit sequence is successfully identified with sufficient signal quality and duration, the receiver concludes that it has found a satisfactory antenna.

Alternately, if, when using the first antenna, the receiver fails to identify the bit sequence "1010 . . . " with sufficient signal quality and duration, the receiver switches to a next antenna to attempt the identification. The switching and failed identification process continues until an antenna is located which successfully identifies the bit sequence with sufficient signal quality. The antenna leading to such success is the satisfactory antenna.

At this point, although a satisfactory antenna has been identified, the receiver cannot be sure whether the identified bit sequence occurred within the preamble field 305 or within the preamble field 309. The receiver cannot be sure because the transceiver may have failed to receive the entire first portion of the preamble well into the preamble field 309. As previously mentioned, such a failure might have been due to: 1) collisions with noise or another transmission; 2) unacceptable signal strength; 3) multipath collisions; or 4) a receiver's inopportune beginning to listen, e.g., upon powering up the receiver after a random power down period to save power.

Thus, because the receiver cannot be sure whether the identified bit sequence occurred within field 305 or within field 309, the receiver begins to wait for either the time stamp "00" (as is contained in a time stamp field 307) or the unique word "0011 0111 1000 0101" (as is contained in a unique word field 311). If the receiver detects the time stamp, the antenna diversity protocol concludes that the n bits of preamble in field 309 provide a sufficient time to conduct a best antenna search. Therefore, the receiver begins cycling through the remaining antennas to attempt to identify the best antenna. Having selected the best antenna, the receiver monitors the remaining transmission of the content of the preamble field 309 to identify the transmission of the unique word in the field 311. The unique word signals the beginning of the remaining portion of the communication packet, i.e., the actual content of the communication.

Alternately, if while waiting for either the time stamp or the unique word the receiver detects the unique word, the receiver concludes that there is no time for a best antenna search because the actual content (data, instructions and/or other information) of the communication packet is going to begin. Instead, the receiver retains the satisfactory antenna to receive the remaining portion of the communication packet.

Additionally, the receiver can easily detect the time stamp "00" by simple pattern recognition circuits keyed to sequential bits "1001" or "010010", for example. Further detail regarding this process is provided below in reference to FIG. 10.

Moreover, the illustrated preamble of FIG. 3 represents minimal departure from a commonly used frequency hopping (FH) dotting pattern preamble, with the departure being the addition of the time stamp in field 307. As such, the illustrated preamble provides an viable alternative to current FH preambles with minimal change in existing hardware and software.

Figure 4:
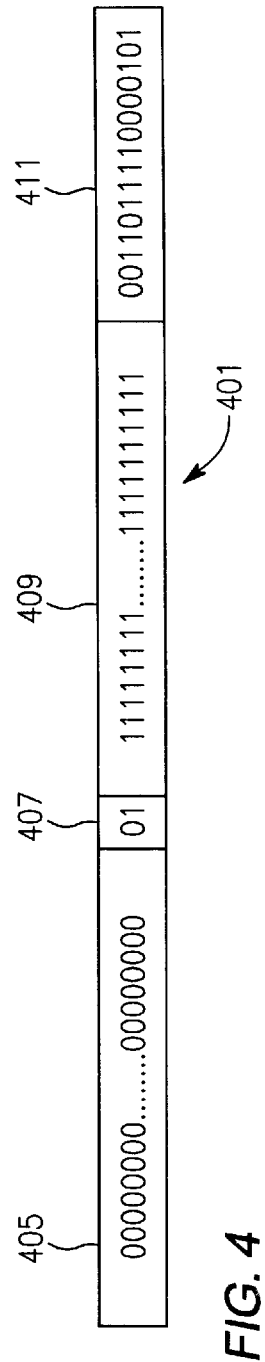
FIG. 4 is a diagram which illustrates an alternate embodiment of the preamble bit sequence of FIG. 2 which can also automatically distinguish the first from the second preamble field whether or not the time stamp has been detected.

FIG. 4 is a diagram which illustrates an alternate embodiment of the preamble bit sequence of FIG. 2 wherein the content of the first preamble field can be easily distinguished from the second preamble field whether or not a time stamp has been detected. More specifically, to utilize the illustrated preamble embodiment, receivers in the network are configured with two pattern recognition circuits, one keyed to the first preamble portion 405 ("0000") and the other keyed to the second preamble portion 409 (i.e., "1111"). As such, the actual time stamp "01" does not require an independent recognition circuit, as becomes apparent when considering the operation of the diversity protocol of FIG. 4.

In particular, the receiver first sequences through its available antennas until an antenna is identified that can satisfactorily detect the bit sequence within either the field 405 or within the field 409. The receiver accomplishes such detection using the corresponding recognition circuits, operating in parallel to simultaneously look for the either preamble sequence. In addition, the proposed preamble sequences in fields 405 and 409 are proposed for use in a direct sequence (DS) spread spectrum transceiver environment, wherein the preamble would be scrambled using a known spreading code to provide spectral whitening. Thus, the receiver uses the spreading code in conjunction with the recognition circuits to identify the illustrated preamble bit sequences.

As soon as the receiver identifies the satisfactory antenna, the receiver immediately determines whether the preamble transmission is still within the field 405 or within the field 409. This is possible because the receiver merely checks to see which recognition circuit proved to be successful in identifying the satisfactory antenna. Thereafter, as previously described, the receiver can appropriately determine whether to attempt the best antenna search or not. In particular, only if the receiver identifies a satisfactory antenna while still somewhere within the preamble field 405 will the receiver begin the best antenna search.

Note that unlike the embodiment illustrated in FIG. 3, the receiver need not wait until the time stamp (or the beginning of the field 409) is detected to begin the best antenna search, although it could be configured to do so, if so desired. In addition, although not shown, the time stamp bit sequence 407 might also be selected so as to be completely different from the two unique preamble fields 405 and 409, if so desired. Correspondingly, a recognition circuit to identify such a time stamp could also be incorporated so as to immediately trigger the best antenna search if such a design proves viable for a particular solution.

Figure 5:
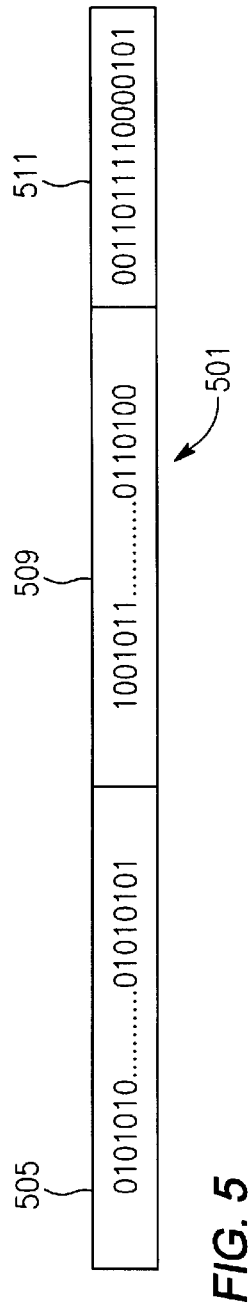
FIG. 5 is a diagram which illustrates another embodiment of the preamble bit sequence of FIG. 2 which also automatically distinguish the first from the second preamble field, and wherein the first field bit sequence is designed for rapid synchronization while the second is selected for optimizing multipath compensation.

FIG. 5 is a diagram which illustrates another embodiment of the preamble bit sequence of FIG. 2 which automatically distinguish the first from the second preamble field, and wherein the first field bit sequence is designed for rapid synchronization while the second is selected for optimizing multipath compensation. As previously mentioned, the preamble can be used for more than one purpose. Two exemplary purposes, of course, include antenna diversity and multipath compensation. For antenna diversity, rapid identification of preamble bit sequence proves to be a significant factor for defining a bit sequence. Thus, an short, repeatable pattern such as "010101 . . . " proves to be highly desirable for such purposes. The longer the pattern, the longer the identification process.

Similarly, factors exist which can aid the multipath compensation process by choosing an appropriate preamble bit pattern. In particular, to accommodate multipath compensation, auto-correlation techniques are used to construct filters (herein referred to as "adaptive filters") which attempt to minimize multipath interference, e.g., interference between a transmission taking a more direct path to the receiver and the same transmission which reaches a receiver at some time delay thereafter along an alternate, less direct pathway. Thus, to choose an appropriate preamble bit pattern to optimize multipath compensation, a bit pattern with good correlation properties should be chosen, such as any of the shorter length barker codes. An exemplary sequence illustrated in FIG. 5 involves the sequence "1001010" followed by the inverted form "0110101", which forms an overall fourteen bit, repeatable pattern.

To accommodate both multipath compensation and antenna diversity, a portion of the preamble is allocated to optimize one while another portion is allocated to optimize the other. Specifically, in a first portion of the preamble in a field 505, the preamble bit sequence is defined for rapid preamble detection, while in a second portion of the preamble in a field 509, a bit pattern attempting to optimize multipath compensation selected.

As previously described, a receiver begins by identifying a satisfactory antenna using two recognition circuits—one for the sequence in the field 505 and one for the sequence in the field 509. If the satisfactory antenna is located while receiving the contents of the field 505, the receiver immediately begins a best antenna search which may or may not span into the field 509. Once the best antenna is identified and selected, the receiver performs adaptive filtering to minimize multipath interference using the remaining bit sequence in the field 509.

Figure 6:
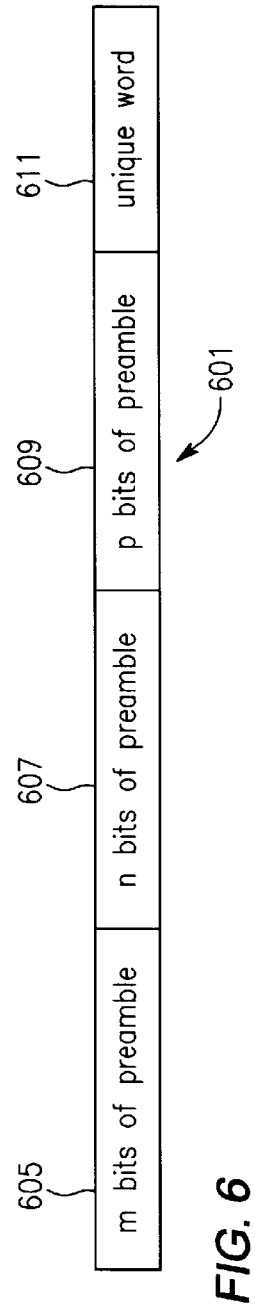
FIG. 6 is a diagram which illustrates an alternate generic embodiment of a preamble bit sequence that uses a plurality of preamble fields to optimize antenna diversity and multipath compensation in the radio communication network of FIG. 1.

FIG. 6 is a diagram of an alternate generic embodiment of a preamble bit sequence that illustrates the use of a plurality of preamble fields to optimize antenna diversity and multipath compensation in the radio communication network of FIG. 1. With the plurality of fields, the diversity protocol has better feedback as to the remaining preamble, and, thus, can select a diversity and multipath compensation sequence tailored to optimize the available preamble in case a portion of the transmitted preamble happens to be missed. However, to identify the content of each of fields 605, 607 and 609, corresponding recognition circuits that operate in parallel must be added to the receiver. In addition, although only three fields are shown, more might be added along with appropriate corresponding recognition circuitry as proves necessary or desirable.

Figure 7:
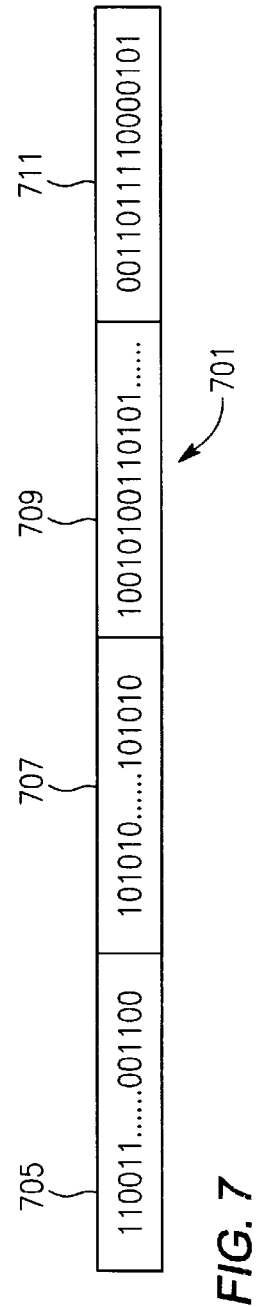
FIG. 7 is a diagram which illustrates a specific embodiment of a preamble bit sequence of FIG. 6 that provides for a distinguishable synchronzation pattern in the first field, a rapid synchronization pattern in the second field, and an optimal multipath compensation pattern in the third field.

FIG. 7 is a diagram which illustrates a specific embodiment of a preamble bit sequence of FIG. 6 that provides for a distinguishable synchronization pattern in the first field, a rapid synchronization pattern in the second field, and an optimal multipath compensation pattern in the third field. A more detailed flow chart representation of the antenna diversity protocol can be found below in reference to FIGS. 9a–c.

Figure 8A:
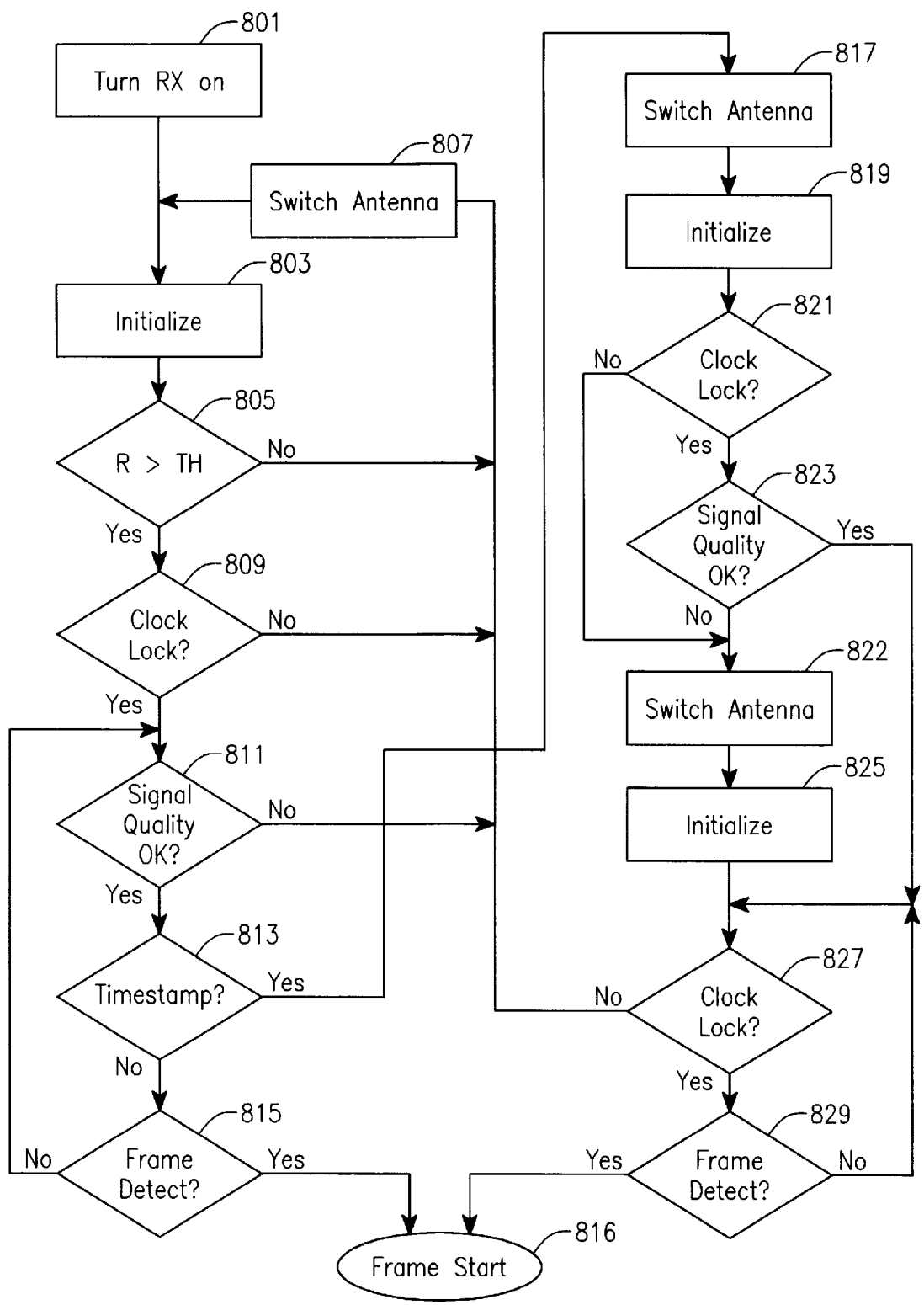
FIG. 8a is a flow diagram illustrating the functionality of the antenna diversity protocol executed by the transceivers of FIG. 1 when using a single time stamp preamble of FIG. 3.

FIG. 8a is a flow diagram illustrating the functionality of one embodiment of the antenna diversity protocol executed by the transceivers of FIG. 1 when using a single time stamp preamble of FIG. 3. The receiver may initially be in a low power consuming, or sleep, mode to conserve battery power. The receiver is first turned on at a block 801, and performs an initialization process at a block 803. Until the receiver receives a signal that is greater than a received signal strength (RSSI) threshold at a block 805, the receiver repeatedly switches antennas at a block 807, performs the initialization process at block 803, and performs the threshold test at block 805.

When the RSSI is greater than the threshold, the receiver will still switch antennas at block 807 and loop until the receiver finds an antenna capable of meeting the threshold requirement and permitting clock lock with the preamble at a block 809. When clock lock is achieved, the receiver will again switch antennas at block 807 and loop until the received signal quality is determined to be satisfactory at a block 811. In other words, the receiver will continuously switch back and forth between antennas until the receiver is able identify a satisfactory antenna.

When a satisfactory antenna is identified, the receiver, using recognition processing circuitry, listens for either a time stamp in the preamble period at a block 813 or a frame detect indication at a block 815. If the receiver happened to identify the satisfactory antenna after the time stamp occurred, the receiver, using the satisfactory antenna, will detect a start of frame indication, i.e. a unique word, at block 815. If a frame is detected, the receiver initiates normal frame reception at a block 816 using the satisfactory antenna to receive the communication packet content. If a frame is not detected, the receiver monitors the preamble signal quality (loops back to block 811) using the satisfactory antenna to determine whether the antenna is still satisfactory. If it is not satisfactory, the receiver switches antennas at block 807 and repeats the process.

When a time stamp is received at block 813, the receiver switches antennas at a block 817 to attempt to determine whether the other (i.e., second) antenna is better. After an initialization process at block 819, the receiver attempts to achieve preamble clock lock using the second antenna at a block 821. If clock lock is not achieved at block 821, the receiver again switches back to the first, or satisfactory, antenna at a block 822, goes through an initialization process at a block 825, and determines whether it still has preamble clock lock at a block 827. If clock lock remains, the receiver uses the first, or satisfactory, antenna to detect a frame at block 829.

If preamble clock lock is achieved using the second antenna at block 821, the receiver tests the preamble signal quality using the second antenna at a block 823. If the second antenna signal quality is greater than that of the first, or satisfactory, antenna, the receiver determines whether it still has preamble clock lock using the second antenna at a block 827, and, if it does, it uses the second antenna to attempt to detect a frame at a block 829. If the second antenna signal quality is not greater than that of the first, the receiver switches back to the first, or best, antenna at block 822 and proceeds as described above.

If at any point a frame is detected at block 829, the receiver initiates normal frame reception using whichever antenna is selected. If a frame is not detected at block 829, the receiver again determines whether it still has preamble clock lock using the selected antenna at block 827. If at any point the receiver no longer has preamble clock lock at block 827 using the selected antenna, the receiver switches antennas at block 807 and repeats the whole process to determine a satisfactory antenna.

Figure 8B:
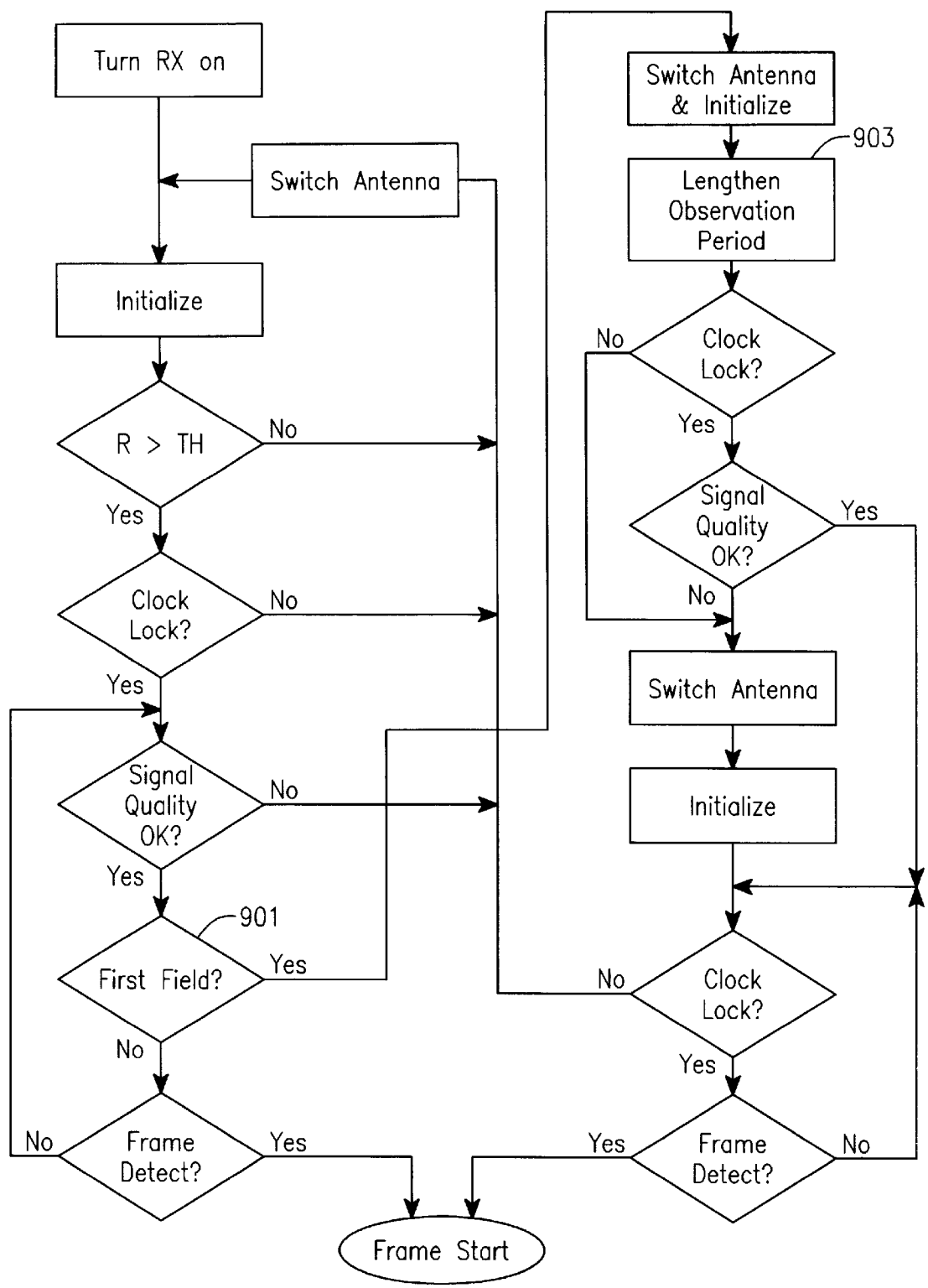
FIG. 8b is a flow diagram illustrating the functionality of the antenna diversity protocol executed by the transceivers of FIG. 1 when using automatic field identification as specified in the preamble of FIGS. 4–5.

FIG. 8b is a flow diagram illustrating the functionality of the antenna diversity protocol executed by the transceivers of FIG. 1 when using automatic field identification as specified in the preamble of FIGS. 4 and 5. The functionality of the protocol of FIG. 8b corresponds to that of FIG. a discussed above except that the receiver, rather than listening for a time stamp at a block 901 after it has selected a satisfactory antenna, contains detection circuitry (recognition processing circuitry) to determine whether or not the preamble is in its first field. If the first field is detected, the receiver switches antennas and attempts to determine whether the other antenna is better, as discussed above. However, in this case, at a block 903, because the receiver has more time, the receiver lengthens the observation period, i.e., the time the receiver spends evaluating a given antenna's performance.

Figure 9A:
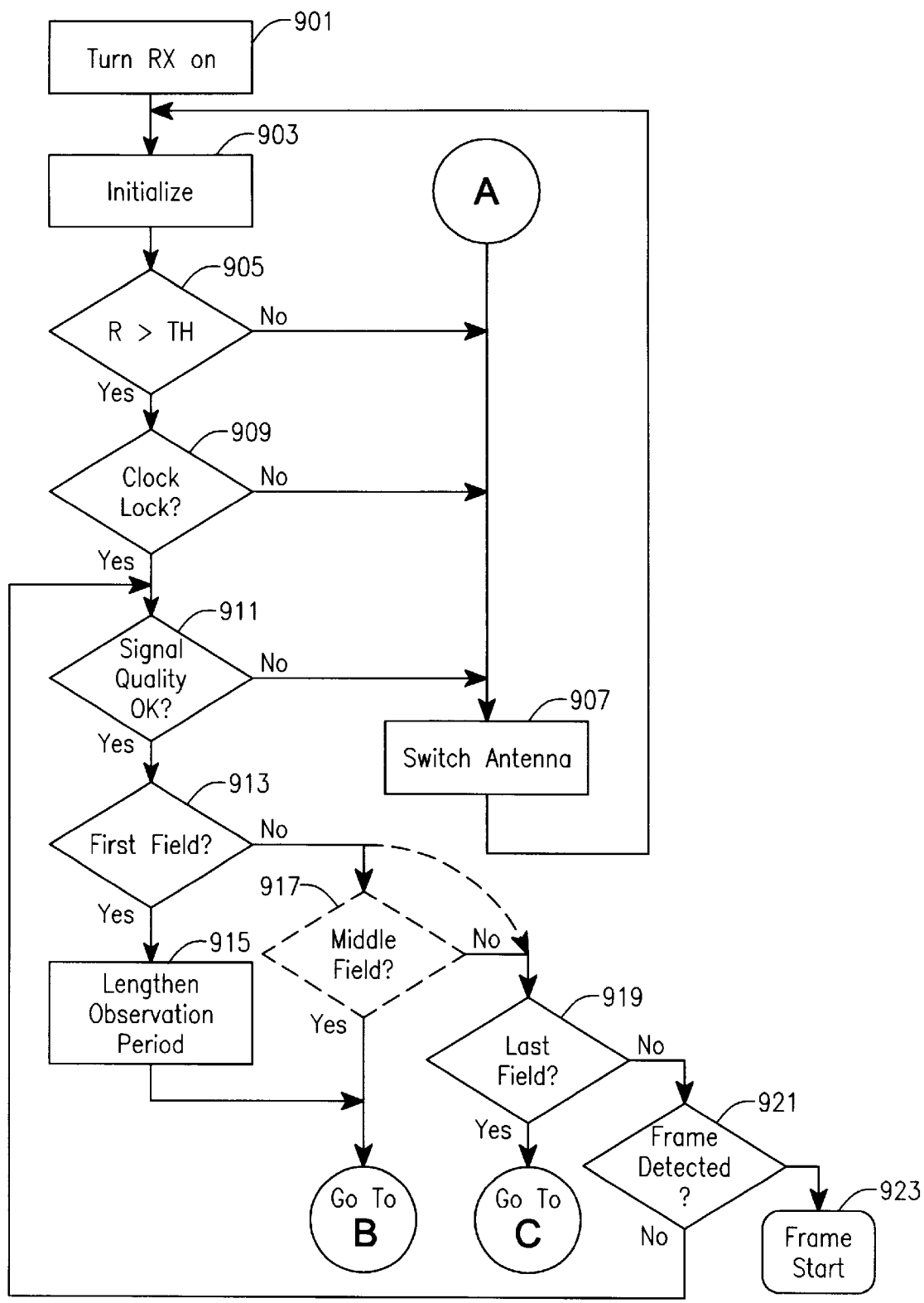
FIGS. 9a–c are a flow diagrams illustrating the functionality of the antenna diversity protocol executed by the transceivers of FIG. 1 when using the multiple field preamble of FIGS. 6–7.
Figure 9B:
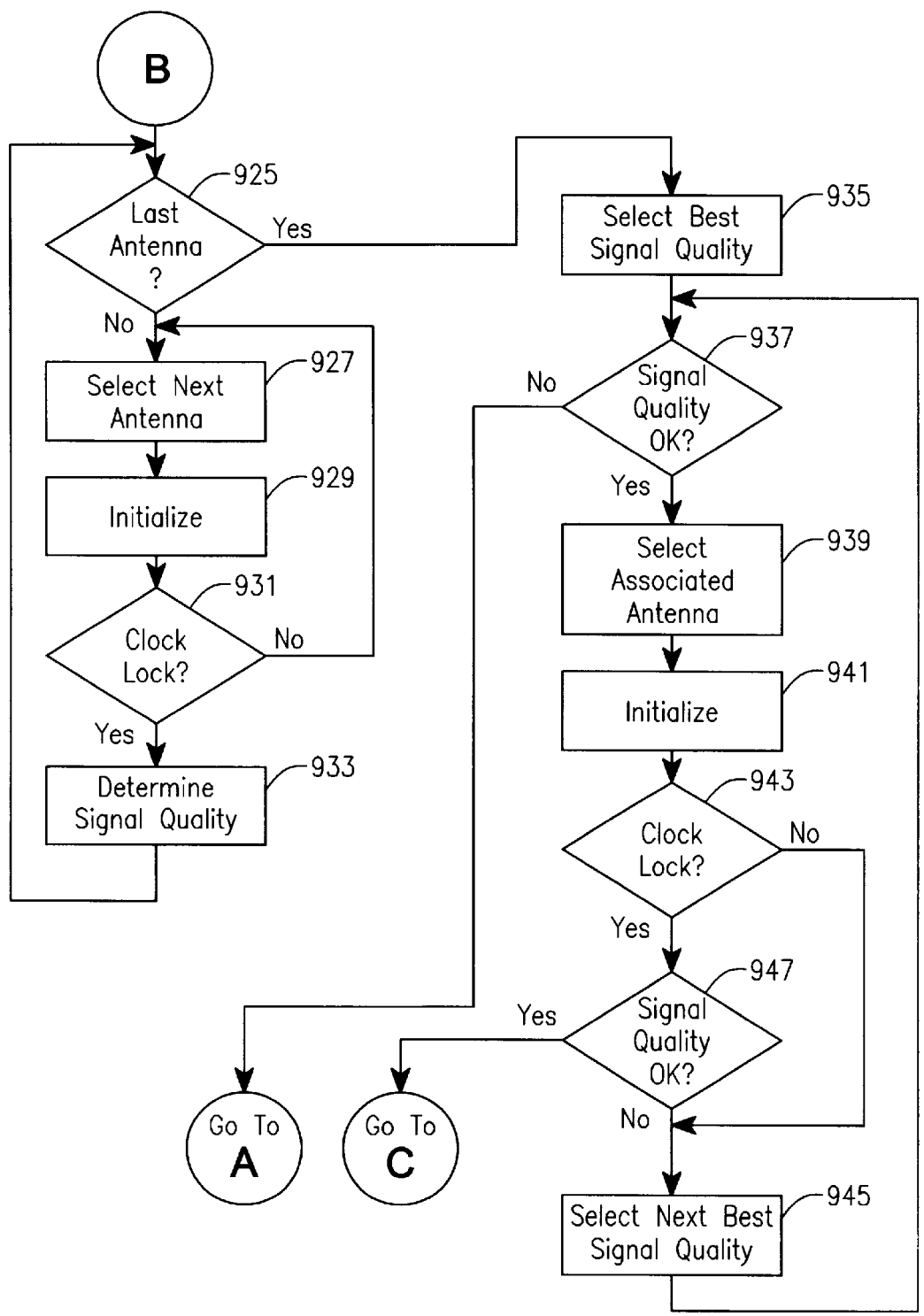
Figure 9C:
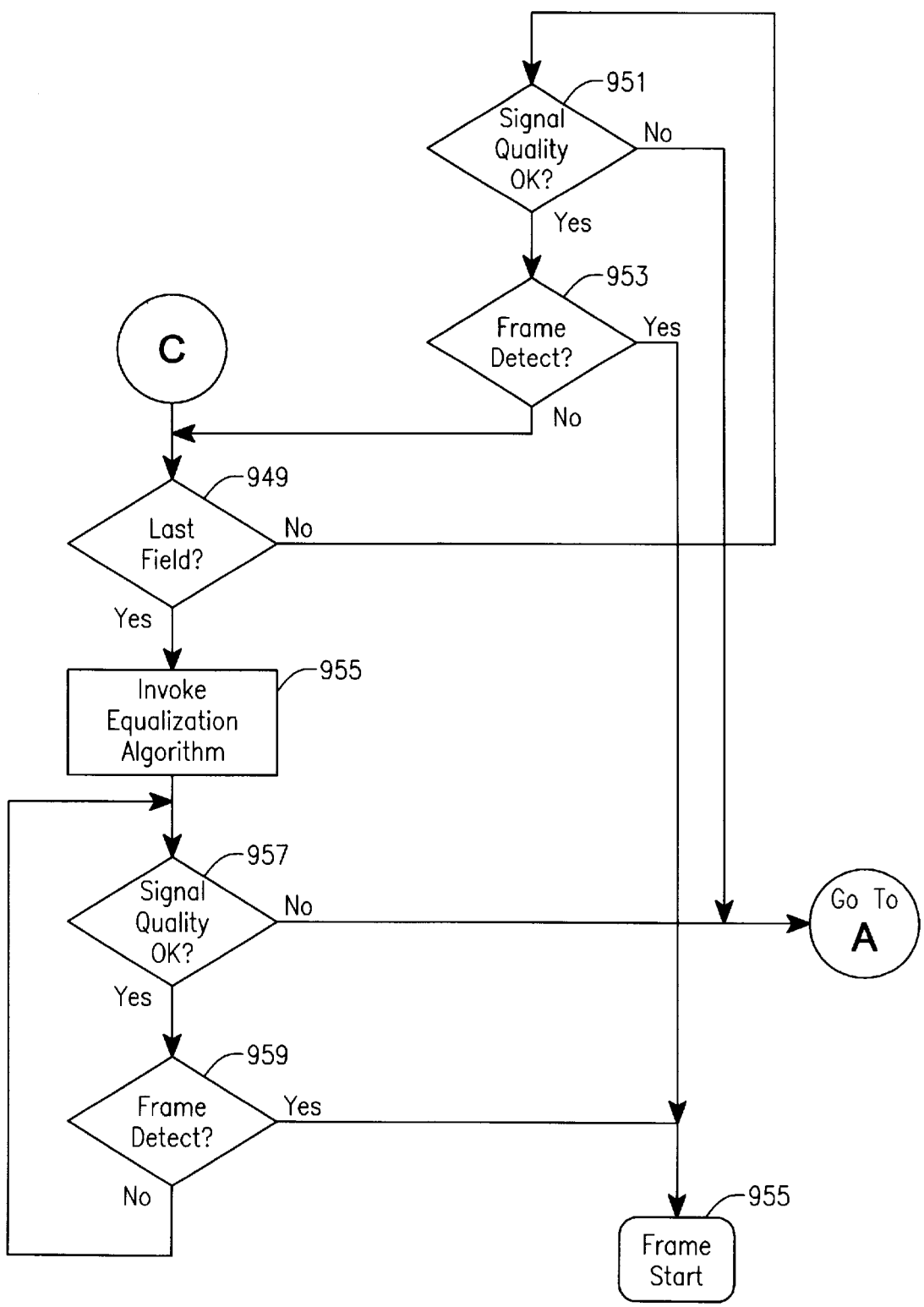

FIGS. 9a–c are a flow diagram illustrating the functionality of the antenna diversity protocol executed by the transceivers of FIG. 1 when using the multiple field preamble of FIGS. 6 and 7. The receiver is first turned on at a block 901, and performs an initialization process at a block 903. Until the receiver receives a signal that is greater than a RSSI threshold at a block 905, the receiver switches antennas at a block 907 and performs the initialization process at block 903. When the RSSI is greater than the threshold, the receiver will still switch antennas at block 907 and loop until the receiver achieves clock lock with the preamble at a block 909. When clock lock is achieved, the receiver will again switch antennas at block 807 and loop until the preamble signal quality is determined to be satisfactory at a block 911.

After a satisfactory antenna is selected, the receiver determines at a block 913 whether or not the preamble is in its first field. If it is, the receiver lengthens the observation period at a block 915 and goes to B to determine the best antenna. If the preamble is not in its first field, the receiver determines at a block 917 whether or not the preamble is in its middle field (optional). If it is, the receiver goes to B to determine the best antenna. If the preamble is not in its middle field, or if a middle field does not exist, the receiver determines at a block 919 whether or not the preamble is in its last field. If it is, the receiver goes to C to invoke an equalization algorithm. If the preamble is not in its last field at block 919, the receiver attempts to detect a frame at a block 921 using the selected satisfactory antenna. If a frame is detected at block 921, the receiver initiates normal frame reception at a block 923 using the selected satisfactory antenna. If a frame is not detected at block 921, then the receiver returns to block 911 to repeat the process.

As mentioned above, the receiver goes to B to determine the best antenna. At a block 925, the receiver determines whether or not the currently selected antenna is the last antenna to be tested. If not, the receiver selects the next antenna at a block 927, performs an initialization process at a block 929, and attempts preamble clock lock at a block 931. If the receiver does not achieve clock lock, it selects the next antenna. If the receiver achieves clock lock on any particular antenna at block 931, the receiver determines the signal quality of that particular antenna at a block 933, stores it, and loops to block 925.

When the receiver determines that all antennas have been tested, the receiver selects the best signal quality at a block 935 and tests to determine whether the selected signal quality is satisfactory at a block 937. If it is not satisfactory, the receiver goes to A to switch antennas at block 907 and repeat the process of selecting a satisfactory antenna. If the signal quality is satisfactory, the receiver selects the associated antenna at block 939, goes through an initialization process a block 941, and attempts preamble clock lock at a block 943.

If clock lock is not achieved using the antenna having the best signal quality, the next best signal quality is selected at a block 945 and the receiver loops back to block 937. Once clock lock is achieved at block 943, the receiver tests the signal quality of the selected antenna at a block 947. If the signal quality is not satisfactory, the receiver goes to block 945 to select the next best signal quality as discussed above. If the signal quality of the selected antenna is satisfactory at block 947, the receiver goes to C and determines whether the preamble is in its last field at a block 949. If it is not in its last field, the receiver tests whether the signal quality of the selected antenna is satisfactory at a block 951. If the signal quality of the selected antenna is not satisfactory at block 951, the receiver goes to A to repeat the process of selecting a satisfactory antenna. If the signal quality is determined to be satisfactory at block 951, the receiver attempts to detect a frame at a block 953 using the selected antenna. If a frame is detected at block 953, the receiver initiates normal frame reception at a block 955 using the selected antenna. If a frame is not detected at block 953, the receiver returns to block 949 to determine if the preamble is in its last field.

If at any point the receiver determines at block 949 that the preamble is in its last field, the receiver invokes an equalization algorithm at a block 955, and tests at a block 957 to determine whether the signal quality of the selected antenna is satisfactory. If it is not determined to be satisfactory at block 957, the receiver goes to A to repeat the process of selecting a satisfactory antenna. If the signal quality is determined to be satisfactory at 957, the receiver attempts to detect a frame at a block 959 using the selected antenna. If a frame is detected at block 959, the receiver initiates normal frame reception at block 955 using the selected antenna. If a frame is not detected at block 959, the receiver returns to block 957 to monitor the signal quality of the selected antenna.

Figure 10:
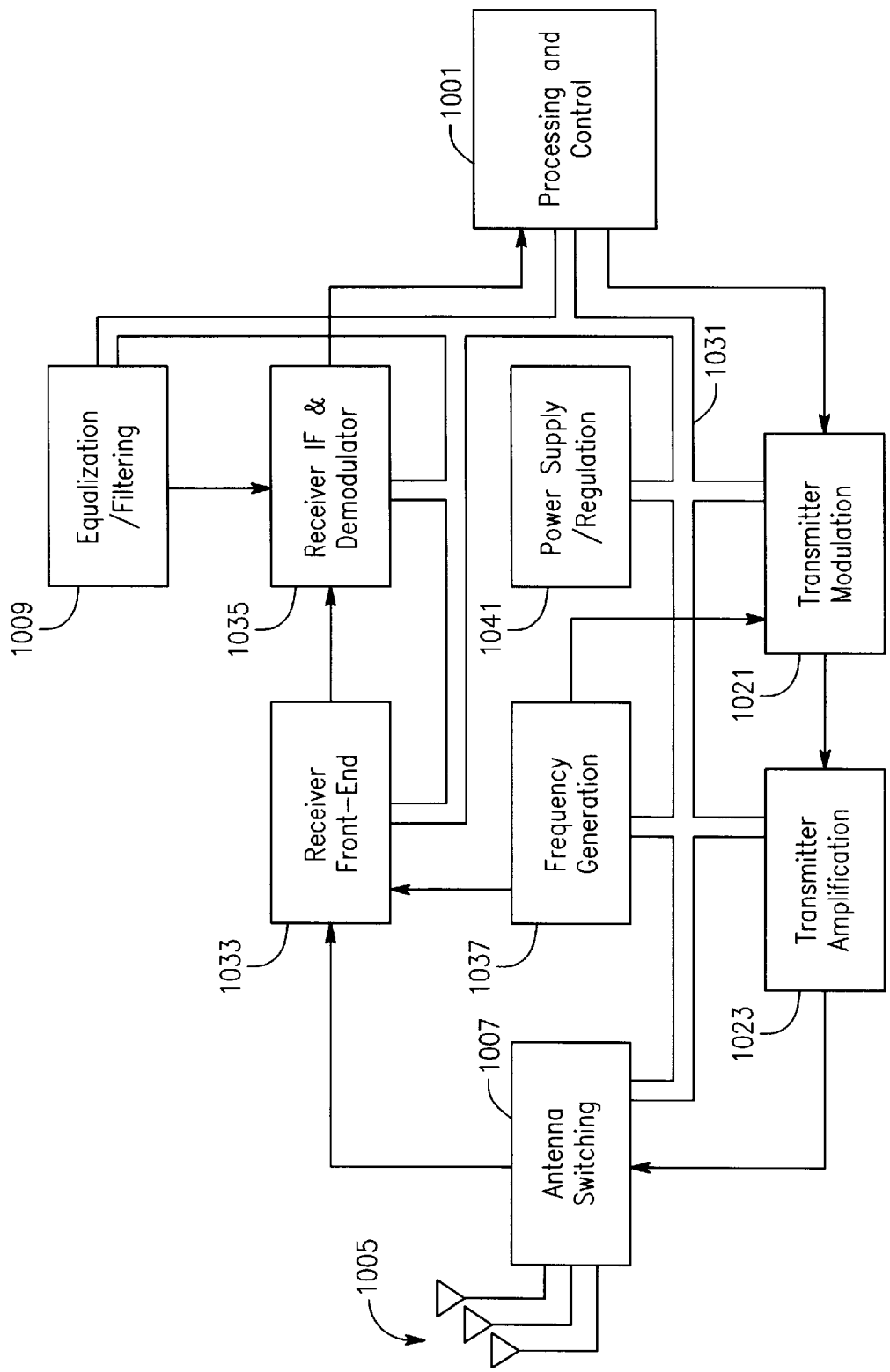
FIG. 10 is a circuit diagram illustrating the transceiver circuitry of a transceiver built in accordance with the present invention, such as the transceivers illustrated in FIG. 1.

FIG. 10 is a circuit diagram illustrating the transceiver circuitry of a transceiver built in accordance with the present invention, such as the transceivers illustrated in FIG. 1. In the transceiver, a processing and control circuit 1001 operates using an antenna diversity protocol to direct the selection of one of a plurality of antennas 1005 (via a switching circuit 1007), while also directing multipath compensation and associated timing thereof (via an equalization circuit 1009). The details of such direction can be found with reference to the description associated with the various flow charts of FIGS. 8a–9c, for example, and need not be repeated.

Generally, the processing and control circuit 1001 controls the transmitter portion of the transceiver, i.e., transmitter modulator and amplification circuits 1021 and 1023, directly via the control bus 1031, and indirectly via the power supply circuit 1041. Similarly, the control circuit 1001 indirectly and directly controls the receiver portion of the transceiver, i.e., the front-end, IF and demodulator, and the equalization circuits 1033, 1035 and 1009, respectively. A frequency generation circuit 1037 is provided to deliver the base frequency to the transmitter modulator 1021 and the receiver front-end 1033.

The illustrated transceiver is typical to current designs with two important exceptions: 1) the receiver IF and demodulator circuit 1035 provides additional recognition circuitry; and 2) the processing and control circuit 1001 utilizes the antenna diversity protocols built in accordance with the present invention. In particular, instead of only having recognition circuitry being able to detect a single preamble sequence and recognition circuitry being able to detect a single unique word, depending on the configuration (see the specific embodiments herein), the circuit 1035 contains recognition circuitry to identify second, third, etc., preamble portions, time stamps, and alternate unique words. The specific recognition circuitry itself is identical to that currently used to detect single preambles and unique words, and, thus, are readily available in the art. Moreover, for specific antenna diversity protocol embodiments, reference is made to the various other FIGS.

Figure 11:
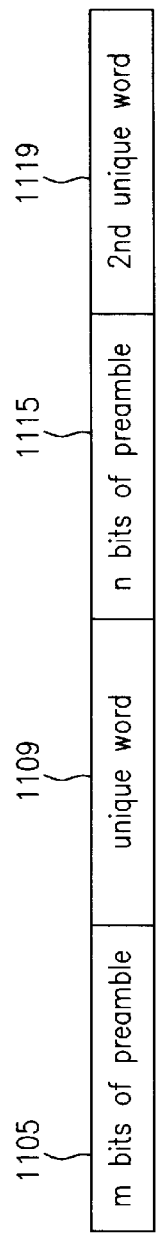
FIG. 11 is a diagram illustrating a preamble bit sequence that has been selectively extended by a receiver that has informed a transmitter of its capability or desire to utilize the additional preamble portions for its antenna diversity protocol.

FIG. 11 is a diagram illustrating a preamble bit sequence that has been selectively extended by a receiver that has informed a transmitter of its capability or desire to utilize the additional preamble portions for its antenna diversity protocol. More particularly, in a network environment wherein most receivers are configured for using only a single preamble bit sequence preceding a unique word, a specially configured receiver may specifically or generally request that all future transmissions utilize an additional preamble portion creating an expanded preamble 1101.

Specifically, for receivers not configured with a recognition circuit to identify the content of a second preamble field 1115, such receivers perform all of their antenna diversity and compensation procedures during a first preamble field 1105. For example, because the receiver cannot tell where in the bit sequence of the field 1105 that it detects a satisfactory antenna, the receiver does not search for a best antenna. Instead, the receiver merely awaits the unique word in a field 1109 which signifies the beginning of the content portion of the communication packet. With such a receiver, i.e., one which is only configured to identify the first preamble field 1105, transmitters never extend the preamble and immediately transmit the content portion of the communication packet after the unique word in the field 1109 is sent.

However, if a receiver is configured with recognition circuitry to identify the content of the second preamble field 1115, that receiver can register its capability with all associated transmitters. As a result, the associated transmitters do extend the preamble 1101 as illustrated by the second preamble field 1115 and a second unique word field 1119. Thus, such a receiver which detects a satisfactory antenna in the first preamble period 1105 can begin a search for a best antenna and invoke an adaptive equalization algorithm during the second preamble period 1115. It can be appreciated that, in such a configuration, the first unique word 1109 constitutes a time stamp. Additionally, it desirable (yet not necessary) that the unique word 1109 and the second unique word 1119 have different bit sequences to prevent a false indication of the beginning of the communication packet content.

Moreover, a so equipped receiver (in a transceiver) might request an extended preamble, such as in a request for poll, poll and acknowledge handshake sequence. For example, the receiver (e.g., within a mobile transceiver) request that a transmitter (e.g., within a stationary transceiver) poll the receiver using the extended preamble. The transmitter responds, for that request or session only, by polling the receiver using the extended preamble. Otherwise, the transmitter polls using the shorter, non-extended preamble for receivers either not so equipped to handle the extended preamble or equipped but not requesting the extended preamble. Alternately, after a specific request to do so, the transmitter can be instructed to continue to use an extended poll whenever communicating with the equipped receiver until requested by that receiver to do otherwise.

Figure 12:
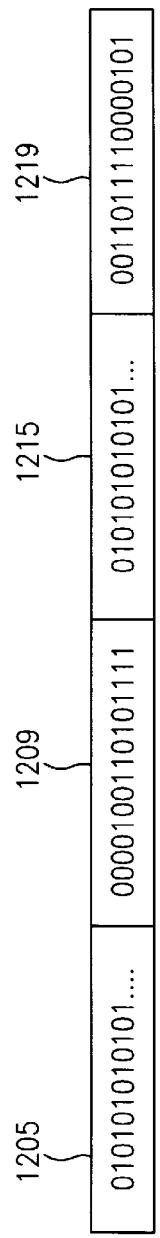
FIG. 12 is a diagram which illustrate a specific embodiment of the preamble bit sequence of FIG. 11 wherein identical first and second portions of the preamble are separated by the first unique word and a second unique word is used to indicate the actual beginning of the remaining portion of a communication packet.

FIG. 12 is a diagram which illustrate a specific embodiment of the preamble bit sequence of FIG. 11 wherein identical first and second portions of the preamble are separated by the first unique word and a second unique word is used to indicate the actual beginning of the remaining portion of a communication packet. In this embodiment, an appropriately configured receiver contains a recognition circuit for identifying a first or a second portion of a preamble contained in corresponding fields 1205 and 1215. In addition, a recognition circuit for identifying a first unique word contained in a field 1209 is required. In addition, a third recognition circuit is necessary for identifying a second unique word (identifiably distinct from the first) as contained in a field 1219.

With this appropriate configuration, the receiver first identifies a story antenna. Because it cannot determine whether the satisfactory antenna was detected within the field 1205 or within the field 1215, the receiver is forced to listen with the satisfactory antenna to see which unique word happens to be transmitted next. If a first unique word is transmitted, as contained in a field 1209, the receiver (responding to its diversity protocol) concludes that a best antenna search is possible, and begins the search within the field 1215. After selecting the best antenna, the receiver awaits a second unique word. Thereafter, upon encountering the second unique word, as contained in a field 1219, the receiver is warned to prepare to receive the content of the communication packet.

If while listening with a satisfactory antenna to identify which unique word happens to be transmitted the second unique word is detected, the satisfactory antenna is used to receive the content of the communication packet.

Unlike the configuration of FIG. 11, however, in FIG. 12, the first unique word in the field 1209 is only identifiable by receivers capable of receiving the extended preamble. Only the second unique word in the field 1219 is commonly recognizable by all of the receivers. Thus, when a transceiver transmits an non-extended preamble, that preamble consists of the contents of the field 1215 and field 1219. In the extended preamble mode, transceivers extend the preamble by prefacing the contents with the fields 1205 and 1209.

More particularly, upon receiving an extended preamble, each appropriately configured receiver operates as previously described. However, when non-configured receivers (i.e., receivers not capable of utilizing the extended mode) attempt to receive the extended preamble, they first detect a satisfactory antenna. If the satisfactory antenna was detected in the second preamble portion, i.e., in the field 1215, the non-configured receiver continues as it would with any non-expanded preamble by awaiting the unique word in field 1219 which it detects and begins receiving the communication packet content. However, if the satisfactory antenna is detected during the first preamble period in the field 1205, the satisfactory a will likely fail upon encountering the first unique word (because the receiver cannot recognize it). As a result, the receiver will repeat the search for a satisfactory antenna during the second preamble period in the field 1215. This time, however, the non-configured receiver using a newly identified satisfactory antenna can detect the second unique word and receive the subsequent communication packet content.

Figure 13:
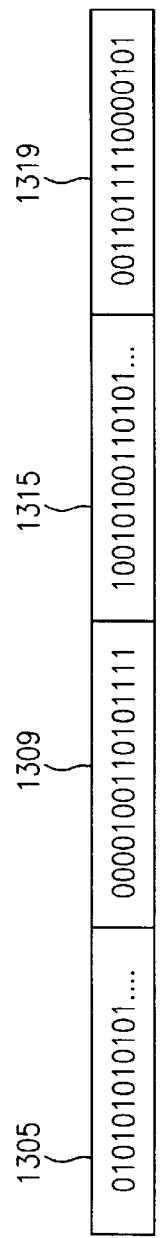
FIG. 13 is a diagram which illustrates another specific embodiment of the preamble bit sequence of FIG. 11 wherein the first portion of the preamble provides a relatively more optimal bit sequence for performing an antenna diversity protocol, while the second portion of the preamble provides a relatively more optimal bit sequence for performing adaptive equalization.

FIG. 13 is a diagram which illustrates another specific embodiment of the preamble bit sequence of FIG. 11 wherein the first portion of the preamble provides a relatively more optimal bit sequence for performing antenna diversity, while the second portion of the preamble provides a relatively more optimal bit sequence for performing adaptive equalization. With exception to the enhanced adaptive equalization possible during the second portion of the preamble, an appropriately configured receiver operates identically to that previously discussed in FIG. 12, and, therefore, need not be repeated.

Similar to their operation in the embodiment illustrated in FIG. 12, non-configured receivers can only detect the second unique word contained in a field 1319, but further can only detect the second preamble content in a field 1315. Thus, any non-configured receiver will not be able to identify the content of fields 1305 and 1309, and, therefore, will effectively ignore them. Instead, the non-configured receivers only detect the latter portion of the extended preamble 1301, and do not know whether the preamble has been extended or not. Thus, with either the extended or the non-extended preamble, the non-configured receiver merely identifies a satisfactory antenna in the field 1315, identifies the unique word in the field 1319, and receives the subsequent communication packet content.

Furthermore, although the preamble illustrations mentioned above illustrate specific field content and numbers of fields, it should be clear in view of the foregoing that alternate content and numbers are all possible depending on a specific users requirements.

In addition, specific reference is made to an Appendix A attached hereto. Constituting further disclosure hereto, the Appendix A is a paper entitled "Preamble Modification for Improved Selection Diversity", by the present inventor, R. Mahany, dated May, 1994. Therein, several alternate embodiments of the present invention are provided which, for example, describe exemplary time periods and bit sequence lengths for DS and FH spread spectrum implementations.

As is evident from the description that is provided above, the implementation of the present invention can vary greatly depending upon the desired goal of the user. However, the scope of the present invention is intended to cover all variations and substitutions which are and which may become apparent from the illustrative embodiment of the present invention that is provided above, and the scope of the invention should be extended to the claimed invention and its equivalents.

What is claimed is:

1. A method for use in a communication network having a transmitter and a separate receiver having a plurality of antennas, the transmitter and the receiver using a preamble of a communication packet to facilitate an antenna diversity protocol in the receiver, the method comprising:

the transmitter transmitting a first preamble portion;

after transmission of the first preamble portion, the transmitter transmitting a second preamble portion which is distinguishable from the first preamble portion; and the receiver, having the plurality of antennas, identifying the first or the second preamble portion for use in antenna diversity protocol processing among the plurality of antennas.

2. The method of claim 1 further comprising the transmitter transmitting the remainder of the communication packet.

3. The method of claim 1 wherein the first preamble portion is designed for rapid synchronization of communication signals.

4. The method of claim 1 wherein the second preamble portion is designed for optimizing multipath compensation.

5. The method of claim 1 further comprising a third distinct preamble portion, the first, second, and third preamble portions, respectively, providing a distinguishable synchronization pattern, a rapid synchronization pattern, and an optimal multipath compensation pattern.

6. The method of claim 1 wherein the transmitter transmits a time stamp bit sequence that is identifiable distinct from the first and second preamble portions.

7. The method of claim 1 further comprising the receiver attempting to select a best antenna from the plurality of antennas for receipt of the remainder of the communication packet if the first preamble portion transmitted is successfully identified by the receiver.

8. The method of claim 7 further comprising the receiver beginning to perform adaptive equalization if the antenna diversity protocol has completed antenna selection.

9. A method for communicating use in a communication network having a transmitter and a separate receiver having a plurality of antennas, the transmitter and the receiver using a preamble of a communication packet to facilitate an antenna diversity protocol in the receiver, the method comprising:

the transmitter transmitting a first of a plurality of preamble portions;

after transmission of the first of the plurality of preamble portions, the transmitter transmitting a second of the plurality of preamble portions which is distinguishable from the first of the plurality of preamble portions; and the receiver identifying the first or the second preamble portion for use in antenna diversity protocol processing.

* * * * *